Patented June 11, 1935

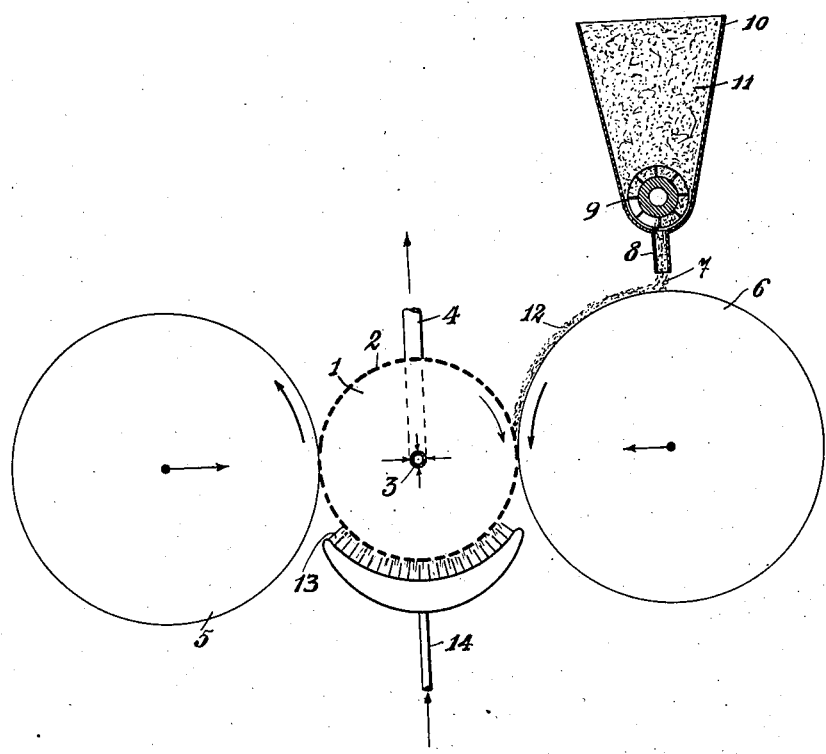

2,004,703

UNITED STATES PATENT OFFICE 2,004,703

PROCESS FOR THE DIRECT MANUFACTURE OF FIBROUS CEMENT TUBES BETWEEN COUPLES OF ROTATING CYLINDERS

Alessandro Magnani, Casale Monferrato, Italy

Application August 2, 1933, Serial No. 683,393
In Germany August 22, 1932

16 Claims. (Cl. 25—155)

There are many known processes for the manufacture of tubes of cement, possibly mixed with fibrous material, by wrapping layers of mortar around a drum with the aid of conveyor belts. These processes require the previous preparation of the mortar, and the formation of the layers to be applied, which causes the machine, necessary for the manufacture of the tubes, to be complicated and cumbersome.

Patent 1,898,881 allows of the simplification of the apparatus for directly running mortar between two revolving cylinders arranged tangentially to each other. However, in the process relating to that patent, it is necessary to prepare, in advance, the mortar which is to be run between the drum to be covered and the molding cylinders.

It has been found that if the powdery mixture forming the solid matter of the mortar, properly measured and mixed, is made to fall in a continuous fine sheet along a generating line of a drum having a perforated cylindrical shell and in which a suitable low pressure causes a suction of air through the said shell, the drum will be covered with a thin dusty layer. If, now, one produces a gentle and very fine spray of water around the said drum, the powdery layer with which it is coated is transformed into a very thick and perfectly adherent mortar, especially if, at least one molding cylinder presses against the said drum.

The invention is based on this principle and consists in the fibrous cement tubes being formed by direct rolling and under pressure of molding cylinders on a foundation drum having a perforated cylindrical shell, in the interior of which there is a pressure lower than on the exterior.

In accordance with the present invention, very thin successive layers of a well mixed powdery dry component of a cementitious mortar are deposited on the foundation drum and around said drum an atmosphere charged with a watery spray is directed toward its surface, so as to moisten said thin layers and allow them to be plastered on the drum and pressed by the molding cylinders.

The distribution of the dry powder on the drum might be made in many ways: for example by the aid of hoppers extending along the drum and having an outlet in the form of a long rectangular feed slit. The feed of the powder might be insured and regulated, for example, by means of rotating paddles or an archimedian screw conveyor, turning on an axis parallel to the long line of the feed. The quantity of powder fed into any zone of the drum might be increased or diminished, according to the desired diameter or thickness of the tube at any particular zone, by correspondingly modifying the width of the opening of the feed at that zone.

However, it might occur, particularly if the tubes to be formed reach large diameters, that the successive fine layers of powder deposited directly on the drum will not be sufficiently continuous and uniform notwithstanding the perfection of distribution, and the effect, on the powder, of the uniform suction caused by the aspiration in the drum and the effect of superficial setting of this powder on the damp layers already formed on the drum. This possible difficulty, then, might be overcome by distributing the powder on the top of one of the molding cylinders of which the surface is unpolished and necessarily moist and so regulating the movements that the said top of the molding cylinder turns towards the drum to be covered. The preliminary formation of the fine powdery layer on the molding cylinder which thus functions as a conveyor, allows of evening the layers, forming on the drum, by the combined effects of crushing and plastering the mortar.

In the machines functioning as in the present process, the molding cylinders act also as plasterers and one of them may act as a feed conveyor.

The process according to the invention may also be carried out by machines of sundry types according to the disposition of the arrangements adopted. The annexed drawing represents, merely by way of example, the scheme of the most complete arrangement mentioned above.

In this scheme the foundation drum I to be covered is provided with a perforated outer cover 2, through which suction is effected by tube 3 connected to suction tube 4. Two molding cylinders 5 and 6 are provided. The latter receives a continuous flow of powder 7, in the form of a sheet extending the whole length of the top of the cylinder, and issuing from slit 8 under the action of a controlling conveyor 9 arranged at the bottom of feed hopper 10 loaded with the powdery mixture 11. The powdery film 12 which forms on the top of cylinder 6 adheres thereto, especially when the cylinder is unpolished, because this is always damp. This film then sticks to drum I, at first from the effects of the suction in 3, and afterwards by agglutination on the thick bed of mortar already formed.

One part of the outer cover 2 of drum I is exposed to the action of a very fine spray of water 13 issuing from any suitable apparatus 14 and covering the whole length of the drum. The powder absorbs this water, of which the quantity should correspond exactly with that necessary to moisten the powder and at its arrival under cylinder 5 this damp powder is plastered on before it reaches a position to receive a fresh charge of powder from cylinder 6. In most cases, if the water is exactly proportioned and not in excess, the suction produced from the interior of the foundation drum may become useless.

The feed of the powder may be made directly on to the outer cover of the drum, as mentioned above. Only one cylinder might suffice should this be the arrangement preferred, but in any case it is always preferable to employ several molding cylinders.

It is evident that sheets of hard fibrous cement may be produced by cutting and flattening tubes of large diameter, as in well known processes, using tubes made according to the present invention.

What I claim is:

1. A process for manufacturing tubes of fibrocement on a formation drum with a porous cylindrical shell, preferably subject to an internal suction and under pressure from molding cylinders which turn and are tangential to the formation drum, comprising, depositing on the formation drum successive very thin layers of well mixed and powdery, dry, mixture of cement and fibrous materials, and directing an atmosphere charged with a watery spray around the said drum towards its surface so as to moisten the said thin layers and cause them to be plastered on the drum and pressed by the molding cylinders.

2. A process according to claim 1, in which the powdery mixture is distributed the whole length of the top of one of the molding cylinders of which the surface is preferably unpolished and which turns towards the formation drum on which it deposits uniformly the said mixture by crushing and plastering.

3. A process for manufacturing concrete tubes on a perforated drum, preferably subject to an internal suction, under pressure from molding cylinders which turn tangentially to the perforated drum, comprising feeding on the drum very thin layers of dry powdered cement well mixed with other fibrous ingredients, moistening the said thin layers with a watery spray directed toward the surface of the said drum to form a plastic mass, and subjecting the plastic mass to the action of the molding cylinders.

4. A process for manufacturing concrete tubes by molding on a drum, under pressure from molding cylinders, thin layers of cement, comprising feeding powdered cementitious material along the whole length of an upper side portion of the drum and moistening it by a watery spray to effect plastering of the material on said drum.

5. A process for manufacturing concrete tubes by molding on a drum, under pressure from molding cylinders, thin layers of cement which are moistened by a watery spray, comprising feeding powdered cementitious material along the whole length of an upper side portion of the drum in the form of a thin sheet-like stream, the plane of which is parallel to the surface of the drum.

6. A process for manufacturing concrete tubes by molding on a drum, under pressure from molding cylinders, thin layers of cement which are moistened by a water spray, comprising feeding powdered cementitious material along the whole length of an upper side portion of the drum in the form of a thin sheet-like stream, the plane of which is parallel to the surface of the drum, and adjusting the thickness of portions of said sheet-like stream as to feed an amount of powder corresponding in each zone throughout the length of the tube to the desired thickness and diameter of the tube in that zone, according to the profile of the drum and the molding cylinders at the different zones along their length.

7. A process for manufacturing concrete tubes by molding on a drum, under pressure from molding cylinders, thin layers of cement which are moistened by a watery spray, comprising feeding powdered cementitious material along the whole length of the top of one of the molding cylinders whose surface is preferably unpolished and which turns towards the drum whereon it deposits uniformly the said mixture by crushing and plastering.

8. A process for manufacturing concrete tubes by molding on a drum, under pressure from molding cylinders, thin layers of cement which are moistened by a watery spray, comprising feeding powdered cementitious material along the whole length of the top of one of the molding cylinders whose surface is preferably unpolished and which turns towards the drum whereon it deposits uniformly the said mixture by crushing and plastering, the feeding of the material being effected in the form of a thin sheet-like stream, the plane of which is parallel to the axis of the cylinder fed.

9. A process for manufacturing concrete tubes by molding on a drum, under pressure from molding cylinders, thin layers of cement which are moistened by a watery spray, comprising feeding powdered cementitious material along the whole length of the top of one of the molding cylinders whose surface is preferably unpolished and which turns towards the drum whereon it deposits uniformly the said mixture by crushing and plastering, said feeding being effected in the form of a thin sheet-like stream, the plane of which is parallel to the axis of the cylinder fed, and adjusting the thickness of portions of said sheet-like stream as to feed an amount of powder corresponding in each zone throughout the length of the tube to the desired thickness and diameter of the tube in that zone, according to the profile of the drum and of the molding cylinders at the different zones along their length.

10. A process according to claim 1, including the step of feeding the powdery mixture to the drum in the form of a continuous fine sheet-like stream, the plane of which is parallel to the axis of the drum.

11. In the formation of molded cementitious tubes on a foundation drum, the steps of rotating the drum, feeding dry cementitious material to the surface of the drum, and moistening the layer of cementitious material on the surface of the drum to form a plastic mass.

12. A method of forming molded cementitious tubes on a foundation drum, comprising rotating a drum, feeding a thin sheet-like stream of dry cementitious material to said drum, moistening the cementitious material adhering to said drum to form a plastic mass, and continuing the rotation of the drum and the feeding of cementitious material until a tube of desired thickness is formed.

13. A method of forming molded cementitious tubes on a foundation drum, comprising rotating a drum, feeding a thin sheet-like stream of dry cementitious material to said drum, moistening the cementitious material adhering to said drum to form a plastic mass, pressing the so-formed plastic layer to effect molding thereof, and continuing the rotation of the drum and the feeding of cementitious material until a tube of desired thickness is formed.

14. A method of forming molded cementitious tubes on a foundation drum, comprising rotating a porous drum, maintaining a sub-atmospheric pressure in said drum, feeding a thin sheet-like stream of dry cementitious material to said porous drum to form a thin coating thereon, and moistening said thin coating to form a plastic moldable mass at the surface of the drum.

15. A method of forming molded cementitious tubes on a foundation drum, comprising rotating a porous drum, maintaining a sub-atmospheric pressure in said drum, feeding a thin sheet-like stream of dry cementitious material to said porous drum to form a thin coating thereon, moistening said thin coating to form a plastic moldable mass at the surface of the drum, and continuing the procedure until a tube of desired thickness is formed on said drum.

16. A method of forming molded cementitious tubes on a foundation drum, comprising rotating a porous drum, maintaining a sub-atmospheric pressure in said drum, feeding a thin sheet-like stream of dry cementitious material to said porous drum to form a thin coating thereon, moistening said thin coating to form a plastic moldable mass at the surface of the drum, molding the plastic layer to form a desired exterior contour, and continuing the procedure until a tube of desired thickness is formed on said drum.

ALESSANDRO MAGNANI.